(12) United States Patent
Wendler et al.

(10) Patent No.: US 12,439,842 B2
(45) Date of Patent: Oct. 14, 2025

(54) CLOSING WHEEL OF A PLANTER USING A SET OF INTERLOCKING ARCHES TO ENSURE OPTIMUM SOIL-TO-SEED CONTACT

(71) Applicants: Anthony R. Wendler, Armstrong, IA (US); James Wendler, Armstrong, IA (US)

(72) Inventors: Anthony R. Wendler, Armstrong, IA (US); James Wendler, Armstrong, IA (US)

(*) Notice: Subject to any disclaimer, the term of this patent is extended or adjusted under 35 U.S.C. 154(b) by 939 days.

(21) Appl. No.: 17/216,691

(22) Filed: Mar. 30, 2021

(65) Prior Publication Data
US 2021/0298223 A1    Sep. 30, 2021

Related U.S. Application Data

(60) Provisional application No. 63/001,547, filed on Mar. 30, 2020.

(51) Int. Cl.
*A01C 5/06* (2006.01)

(52) U.S. Cl.
CPC .............. *A01C 5/066* (2013.01); *A01C 5/068* (2013.01)

(58) Field of Classification Search
CPC ................................ A01C 5/066; A01C 5/068
See application file for complete search history.

(56) References Cited

U.S. PATENT DOCUMENTS

| | | | | |
|---|---|---|---|---|
| 687,953 | A | * 12/1901 | Desjardins | A01C 5/064 111/163 |
| 2,668,490 | A | * 2/1954 | Oehler et al. | B60B 15/26 111/139 |
| 2,682,215 | A | * 6/1954 | Greenwood | A01B 39/26 172/547 |
| 4,570,554 | A | 2/1986 | Clark | |

(Continued)

FOREIGN PATENT DOCUMENTS

| | | | |
|---|---|---|---|
| WO | 2011129916 A1 | 10/2011 | |
| WO | WO-2020208442 A1 | * 10/2020 | ........... A01C 23/023 |
| WO | 2020261043 A1 | 12/2020 | |

OTHER PUBLICATIONS

'Germinator Closing Wheel' by Farm Shop Mfg, Published online Apr. 17, 2019, Accessed Oct. 7, 2023, <https://www.youtube.com/watch?v=d06BYvbh8mM>.*

(Continued)

*Primary Examiner* — Christopher J Sebesta
*Assistant Examiner* — Joel F. Mitchell
(74) *Attorney, Agent, or Firm* — LEGALFORCE RAPC WORLDWIDE

(57) ABSTRACT

A closing wheel assembly for a planter includes a spiked wheel frame and shoulder frame configured to securely mount onto a closing wheel hub. The spiked wheel frame includes a series of outwardly projected radial teeth configured to penetrate soil to form a seed trench. The spiked wheel frame is formed using a set of arch-shaped interlocking segments having a puzzle element and puzzle slot at its ends. Each puzzle element is configured to fit into the puzzle (Continued)

slot of the adjacent arch-shaped segment to form a circular loop. The shoulder frame evenly closes the seed trench formed by the spiked wheel frame as the closing wheel assembly rotates in the soil optimally covering the seed.

16 Claims, 4 Drawing Sheets

(56) References Cited

U.S. PATENT DOCUMENTS

| | | | |
|---|---|---|---|
| 5,022,333 A * | 6/1991 | McClure et al. | A01C 5/068 |
| | | | 172/519 |
| 5,205,228 A | 4/1993 | Mitchell et al. | |
| 5,346,020 A | 9/1994 | Bassett | |
| 5,443,023 A | 8/1995 | Carroll | |
| 5,497,717 A | 3/1996 | Martin | |
| 5,517,932 A | 5/1996 | Ott et al. | |
| D396,863 S | 8/1998 | Bruns | |
| 5,896,932 A | 4/1999 | Bruns | |
| 6,067,918 A | 5/2000 | Kirby | |
| 6,119,608 A | 9/2000 | Peterson et al. | |
| 6,530,334 B2 | 3/2003 | Hagny | |
| 6,578,502 B1 * | 6/2003 | Barnstable et al. | A01C 5/068 |
| | | | 111/164 |
| 6,907,833 B2 | 6/2005 | Thompson et al. | |
| 7,222,575 B2 | 5/2007 | Bassett | |
| 7,240,627 B1 | 7/2007 | Whalen et al. | |
| 7,438,006 B2 | 10/2008 | Mariman et al. | |
| 7,581,503 B2 * | 9/2009 | Martin et al. | A01C 5/066 |
| | | | 172/555 |
| 7,757,777 B1 | 7/2010 | Wipf et al. | |
| 7,784,416 B2 | 8/2010 | Thompson et al. | |
| 7,975,629 B1 | 7/2011 | Martin | |
| 8,291,998 B1 | 10/2012 | Berg et al. | |
| 8,333,161 B2 | 12/2012 | Arnett et al. | |
| 8,393,407 B2 | 3/2013 | Freed | |
| 8,596,375 B2 | 12/2013 | Winick et al. | |
| 8,720,351 B1 * | 5/2014 | Wipf | A01C 7/203 |
| | | | 172/578 |
| 9,043,948 B2 | 6/2015 | Vogts | |
| 9,148,989 B2 | 10/2015 | Van Buskirk et al. | |
| 9,307,690 B2 | 4/2016 | Bassett | |
| 9,456,542 B2 * | 10/2016 | Schaffert | A01C 5/064 |
| D801,396 S | 10/2017 | Whalen et al. | |
| 10,051,772 B2 | 8/2018 | Freed et al. | |
| 10,251,326 B2 * | 4/2019 | Andrews | A01B 35/28 |
| 10,368,476 B2 * | 8/2019 | Andrews et al. | A01C 5/064 |
| 10,383,274 B2 | 8/2019 | Whalen et al. | |
| 10,462,959 B2 | 11/2019 | Whalen et al. | |
| 10,506,754 B2 * | 12/2019 | Christie et al. | A01B 15/18 |
| 10,555,452 B2 | 2/2020 | Martin et al. | |
| 10,624,252 B2 | 4/2020 | Nance | |
| 10,834,865 B2 | 11/2020 | Freed | |
| 2004/0089209 A1 | 5/2004 | Joaquin Romagnoli | |
| 2013/0333599 A1 | 12/2013 | Bassett et al. | |
| 2016/0066497 A1 | 3/2016 | Whalen | |
| 2016/0128266 A1 * | 5/2016 | Phely et al. | B60B 11/02 |
| | | | 172/604 |
| 2019/0269060 A1 * | 9/2019 | Nance | A01B 21/086 |
| 2019/0357428 A1 * | 11/2019 | Freed et al. | A01C 5/064 |
| 2020/0107486 A1 | 4/2020 | Martin et al. | |
| 2020/0214192 A1 | 7/2020 | Martin | |
| 2020/0337217 A1 | 10/2020 | Hodel et al. | |
| 2020/0337218 A1 * | 10/2020 | Puhalla et al. | A01B 63/32 |
| 2020/0352085 A1 | 11/2020 | Freed et al. | |
| 2020/0396894 A1 | 12/2020 | Radtke et al. | |
| 2021/0100157 A1 | 4/2021 | Martin et al. | |
| 2021/0100158 A1 | 4/2021 | Martin | |

OTHER PUBLICATIONS

'Installing Germinator Closing Wheel with John Deere Plastic Hubs' by Farm Shop Mfg, Published online May 15, 2019, Accessed Oct. 7, 2023, <https://www.youtube.com/watch?v=EbUEkqkvlvs>.*
"Germinator Closing wheel" by Farm Shop Mfg, Found Online on [May 26, 2021] https://farmshopmfg.com/product/germinator/.
"Germinator Closing Wheel" by Farm Shop Mfg, Published Online on [Jan. 27, 2021] https://www.youtube.com/watch?v=v1hLc7HqrEE.
"Germinator Closing Wheel in Action" by Farm Shop Mig, Published Online on [Jul. 1, 2019] https://www.youtube.com/watch?v=Xr2MuK83suA.
US Trademark Registration No. 6068183; Word Mark—Farm Shop Publication date: Mar. 17, 2020 Registration date: Jun. 2, 2020.
US Trademark Registration No. 6006222; Word Mark—Germinator Publication date: Dec. 24, 2019 Registration date: Mar. 10, 2020.

* cited by examiner

CLOSING WHEEL OF A PLANTER USING A SET OF INTERLOCKING ARCHES TO ENSURE OPTIMUM SOIL-TO-SEED CONTACT

CLAIM OF PRIORITY

This application is a U.S. Utility Conversion patent application of U.S. Provisional Patent Application No. 63/001,547 titled METHOD AND SYSTEM OF FORMING A CLOSING WHEEL OF A PLANTER USING A SET OF INTERLOCKING ARCHES TO ENSURE OPTIMUM SOIL-TO-SEED CONTACT FOR CONSISTENT GERMINATION AND EMERGENCE OF A CROP filed on Mar. 30, 2020. The content of the aforementioned application is incorporated by reference in entirety thereof.

FIELD OF TECHNOLOGY

This disclosure relates generally to the field of planting equipment, and, more particularly, to a method and system of forming a closing wheel of a planter using a set of interlocking arches to ensure optimum soil-to-seed contact for consistent germination and emergence of a crop.

BACKGROUND

An agricultural crop may be planted using a planter. The planter may open a furrow in the soil and place a seed in the furrow. A closing wheel may further be used at the back of the planter to press on the soil at the sides and/or top of the seed furrow to cover the seed with soil. Pressure may be employed on the packing and/or closing wheels to compress and/or fracture the furrow sidewalls back. However, this may result in poor seedling emergence since the seedlings may have inadequate soil coverage and/or have difficulty pushing itself through a dense layer of soil. In addition, the roots may be unable to penetrate through the compacted sidewalls resulting in poor root formation. This may result in undesirable low yield.

A closing wheel may be made of rubber-tired, plastic, cast iron, and/or other cast metals. The closing wheel made of steel may not have sufficient width provided to its teeth. The inadequate width of the closing wheel and its teeth may not displace sufficient amount of soil to be effective. Further, inadequate width of the closing wheel and its teeth may be inefficient to cover the seed appropriately. The steel closing wheel may need to be cut-out from a workpiece. The circular workpiece may further be machine finished and cut at the center to be able to be fitted onto a standard closing wheel rim and bearing set. This process of cutting the steel at the center of the wheel may result in wasting a lot of steel, making it expensive, especially when using a proper width of material and/or the workpiece. The finishing and machining of the closing wheel, prior to affixing it onto the standard closing wheel rim and bearing set, may require higher tool efficiency and may be uneconomical. The rubber-tired and/or plastic closing wheel may be ineffective in varying tillage and soil conditions. The rubber-tired and/or the plastic closing wheel may wear out easily and require early replacement.

SUMMARY

Disclosed are a method and/or a system of forming a closing wheel of a planter using a set of interlocking arches to ensure optimum soil-to-seed contact for consistent germination and emergence of a crop.

In one aspect, a closing wheel assembly for an agricultural planter includes a spiked wheel frame and a shoulder frame. The spiked wheel frame includes a series of outwardly projected radial teeth configured to penetrate the soil to form a seed trench. The spiked wheel frame is formed using a set of arch-shaped interlocking segments. Each of the arch-shaped interlocking segments includes a puzzle element and a puzzle slot at its ends. The puzzle element of each of the arch-shaped interlocking segments is configured to precisely fit into the puzzle slot of the adjacent arch-shaped interlocking segment to form a circular loop.

The shoulder frame is situated adjacent to the spiked wheel frame and is configured to securely mount onto a closing wheel hub. The shoulder frame displaces the soil towards the seed trench to close the seed trench formed by the spiked wheel frame as the closing wheel assembly rotates in the soil to cover the seed by forming a soil layer around the seed for germination. The shoulder frame is radially welded adjacent to the spiked wheel frame to securely mount onto the closing wheel hub to form the closing wheel assembly.

The shoulder frame may be configured using the set of arch-shaped interlocking segments to form the circular loop. The shoulder frame may further be configured to displace the soil towards the seed trench enable seed-to-soil contact following the soil layer formed around the seed by the displaced soil. The shoulder frame may enable sidewall compaction through soil firming, eliminate air pockets, and/or close the seed trench with inner rim shoulder firming.

The spiked wheel frame may be configured to have a width, a shape, and/or a length of the outward projections of the radial teeth modified depending on a soil condition and/or crop requirement. The spiked wheel frame and/or the shoulder frame may be a cut steel, a molded steel, a molded plastic, a forged steel, and/or a forged metal.

The shoulder frame may be formed by modifying a width and/or a depth depending on the soil conditions and/or crop requirement. An outermost edge of the shoulder frame may be configured to align and/or not align with a base of the radial teeth of the spiked wheel frame. The outermost edge of the shoulder frame may be equal and/or less than the base of the radial teeth of the spiked wheel frame to enable sufficient penetration of the soil.

The arch-shaped interlocking segments may hold the segments together forming the spiked wheel frame and/or the shoulder frame. The puzzle element may be configured to precisely interlock with the corresponding segments.

The outward projections of the radial teeth may be configured to have a width sufficient to displace the soil to enable an improved seedling emergence. The width of the radial teeth may be half inch and the width of the shoulder frame may be ⅜th of an inch to displace the soil.

In another aspect, a closing wheel assembly for an agricultural planter includes a set of arch-shaped interlocking segments forming a spiked wheel frame and a shoulder frame situated adjacent to the spiked wheel frame. The spiked wheel frame has a series of outwardly projected radial teeth configured to penetrate soil to form a seed trench. The shoulder frame is configured to securely mount onto a closing wheel hub and to displace the soil towards the seed trench to close the seed trench formed by the spiked wheel frame when the closing wheel assembly rotates in the soil to cover the seed by forming a soil layer around the seed for germination.

The closing wheel assembly may be configured to promote consistent germination and seedling emergence. Two closing wheels may be mounted at a distance of 1.4 to 1.5 inches between the shoulder frames for attaching to a rear of a planter.

In yet another aspect, a method of a closing wheel assembly for an agricultural planter includes forming a spiked wheel frame having a series of outwardly projected radial teeth and securely mounting a shoulder frame situated adjacent to the spiked wheel frame onto a closing wheel hub. The series of outwardly projected radial teeth are configured to penetrate soil to form a seed trench using a set of arch-shaped interlocking segments. Each of the arch-shaped interlocking segments includes a puzzle element and a puzzle slot at its ends. The puzzle element of each of the arch-shaped interlocking segments is configured to precisely fit into the puzzle slot of the adjacent arch-shaped interlocking segment to form a circular loop. The shoulder frame closes the seed trench formed by the spiked wheel frame as the closing wheel assembly rotates in the soil to cover the seed by forming a soil layer around the seed for germination. The shoulder frame is radially welded adjacent to the spiked wheel frame to securely mount onto the closing wheel hub to form the closing wheel assembly.

The method of the closing wheel assembly may include forming the shoulder frame to aid as a depth gauge by allowing depth control in the light sandy soil by preventing deep running of the closing wheel assembly. The method may further include fabricating the outwardly projected radial teeth angularly to prevent clogging in wet soil.

In a further aspect, the disclosed closing wheel design may include two adjoining circular members, a spiked wheel frame and a shoulder frame, fabricated using a set of arch-shaped interlocking segments to form the closing wheel. Each of the two adjoining circular members (e.g., spiked wheel frame, shoulder frame) of the disclosed closing wheel design may include three arch-shaped interlocking segments. One of the adjoining circular members forming the spiked wheel frame may include radial teething configured to penetrate the soil. The two adjoining circular members may be welded together to form the closing wheel.

The spiked wheel frame may be configured using three larger pieces of arch-shaped interlocking segments with the teething and three smaller pieces of arch-shaped interlocking segments. The three larger pieces of arch-shaped interlocking segments having radial teething may be cut out of approximately half inch thick steel and the three smaller pieces of arch-shaped interlocking segments on the side may be cut out of approximately three eights inch steel.

In one more aspect, each of the two adjoining circular members (e.g., spiked wheel frame and shoulder frame) of the disclosed closing wheel design may include two and/or more arch-shaped interlocking segments.

In one more further aspect, the two adjoining circular members (e.g., spiked wheel frame and shoulder frame) may be configured using two and/or more larger pieces of arch-shaped interlocking segments with the teething and two and/or more smaller pieces of arch-shaped interlocking segments.

The arch-shaped interlocking segments may have a puzzle element and/or similar interlocking edge connection at its ends to precisely interlock with the adjacent segment to form the circular member. The two adjoining circular members (e.g., spiked wheel frame and shoulder frame) of the disclosed closing wheel design may be configured to fit onto a standard closing wheel rim and bearing set. The precise interlocking design of the puzzle and/or similar element may ensure a sturdy formation of the wheel. The puzzle element of the arch-shaped interlocking segments may ensure that segments lock perfectly with the corresponding segment such that nothing slips out of its position, when welded together.

In a further aspect, the arch-shaped segments may have evenly defined edges with a jig element to hold the two adjacent arch-shaped segments together in perfect a circular shape. The evenly defined edges of the arch-shaped segments may eliminate the puzzle piece to reduce laser time to cut the arch segments. Further, the production of making a ring and/or the adjoining circular members out of segments that allow for the best nest in the laser cutting process, may reduce the wastage of steel.

The disclosed closing wheel design may promote consistent germination and emergence of the crop. Steel construction of the disclosed closing wheel design may help reduce down pressure needs in heavy soil and no till conditions. The disclosed closing wheel may be highly effective in all tillage and soil conditions. The disclosed closing wheel may be designed to clean rapidly and it may work in all soil conditions.

The width of the teething on the arch-shaped interlocking segments and the shoulder frame may be designed to vary depending on the soil and tillage conditions for optimum performance. In one more aspect, the width of the teething may be half inch and the width of the shoulder may be ⅜th of an inch to optimally displace the soil.

In an additional aspect, when the teeth of the disclosed closing wheel goes on the ground and fracture off the dirt and/or soil into the furrow, the shoulder may put just the right amount of surface to bring pressure down onto the seed and form the soil around the seed to get the best seed-to-soil contact. The disclosed closing wheel may be configured to have wider teeth to displace sufficient amounts of dirt and/or soil into the furrow. Further, the shoulder frame of the disclosed closing wheel may turn this displaced dirt towards the furrow to sufficiently cover the seed for optimum seed-to-soil contact. The wider radial teething and shoulder design of the disclosed closing wheel may ensure that the seed receives a proper soil-to-seed contact.

In yet another additional aspect, the disclosed closing wheel may eliminate sidewall compaction, allow depth control, eliminate air pockets in the soil and may close seed trench with inner rim shoulder firming. The design of an inner shoulder of the disclosed closing wheel may provide firming over the seed and may aid as a depth gauge. The steel construction of the disclosed closing wheel may help reduce down pressure needs in heavy soil and no till conditions. The disclosed closing wheel may be more effective in all tillage and soil conditions. The disclosed closing wheel may be designed to clean rapidly in wet conditions. The full wheel assembly of the disclosed closing wheel may easily replace a standard closing wheel on most planters.

In one more additional aspect, the disclosed closing wheel assembly may be configured to be installed on a standard planter.

In a further additional aspect, any other variation of interlocking design for positioning of the arch-shaped interlocking segments, whether in the making of this closing wheel and/or other products, may enable a firmly built wheel.

The closing wheel may have solid steel construction made of 50-grade steel to make it more resistant to wearing. The closing wheel and its shoulder may be casted in varying width and thickness. The closing wheel and its shoulder casted in variable widths may be configured to fit onto the standard closing wheel rim and bearing sets and/or any other variation in size.

In a further aspect, the disclosed closing wheel design may be formed using six small arch-shaped interlocking segments. The disclosed closing wheel may have an outside dimension of 15 and ½ inch, of half inch thick plated steel and 15 inches in diameter. The disclosed closing wheel design may not require the steel to be cut out of a whole circle, saving a lot of steel and thus, making it economical.

The methods and systems disclosed herein may be implemented in any means for achieving various aspects, and may be executed in various forms, when executed by a machine, cause the machine to perform any of the operations disclosed herein. Other features will be apparent from the accompanying drawings and from the detailed description that follows.

BRIEF DESCRIPTION OF THE DRAWINGS

The embodiments of this invention are illustrated by way of example and not limitation in the figures of the accompanying drawings, in which like references indicate similar elements and in which.

Figure 1:
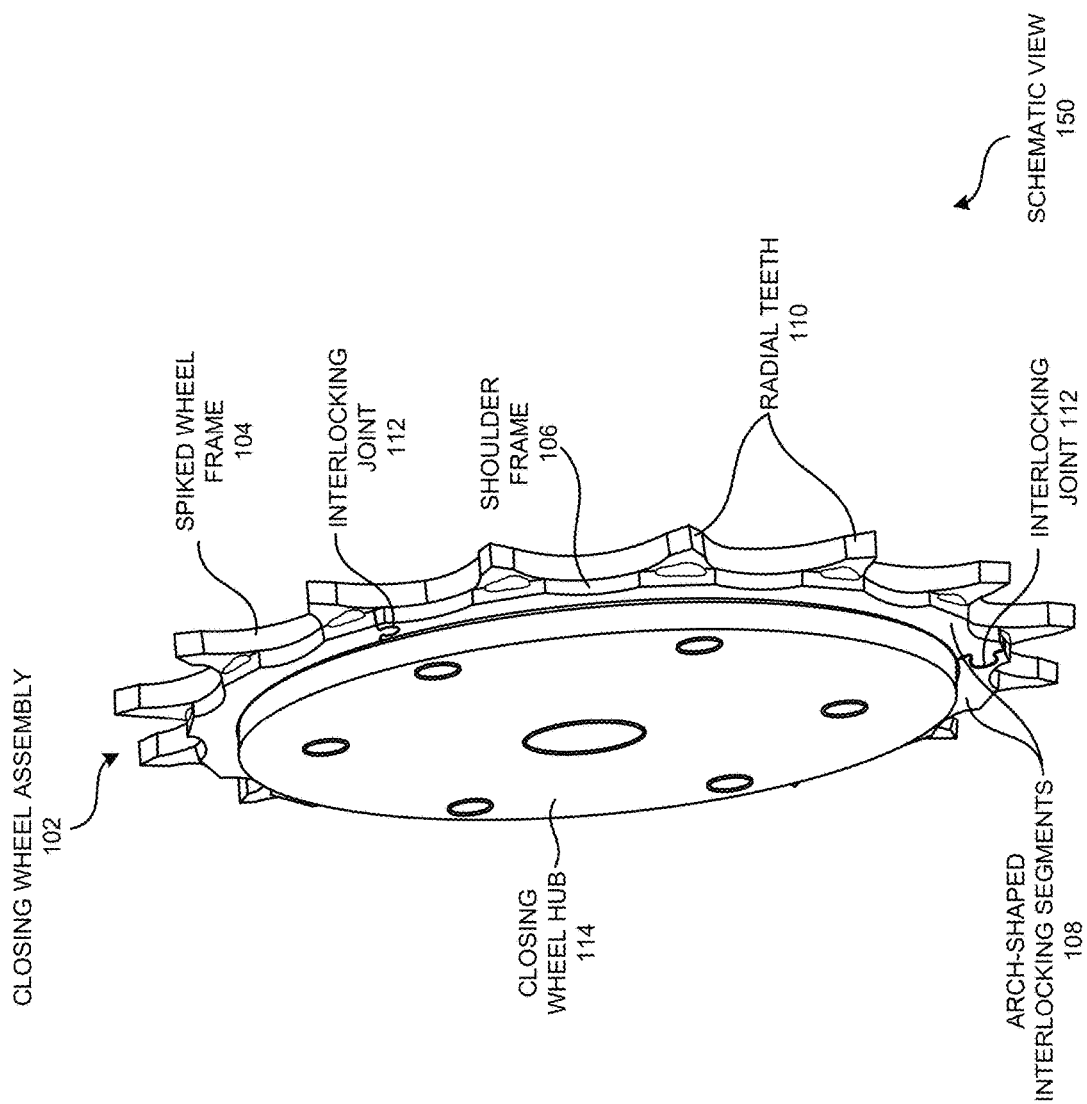
FIG. 1 is a schematic view of a closing wheel assembly of a planter fabricated using a set of interlocking arches and a shoulder frame to optimally displace the soil to cover the seed while planting, according to one embodiment.

Other features of the present embodiments will be apparent from the accompanying drawings and from the detailed description that follows.

DETAILED DESCRIPTION

Example embodiments, as described below, may be used to provide a method, and/or a system of forming a closing wheel of a planter using a set of interlocking arches to ensure optimum soil-to-seed contact for consistent germination and emergence of a crop.

In one embodiment, a closing wheel assembly 102 for an agricultural planter includes a spiked wheel frame 104 and a shoulder frame 106. The spiked wheel frame 104 includes a series of outwardly projected radial teeth 110 configured to penetrate soil to form a seed trench. The spiked wheel frame 104 is formed using a set of arch-shaped interlocking segments 108. Each of the arch-shaped interlocking segments 108 includes a puzzle element 302 and a puzzle slot 304 at its ends. The puzzle element 302 of each of the arch-shaped interlocking segment 108 is configured to precisely fit into the puzzle slot 304 of the adjacent arch-shaped interlocking segments 108 to form a circular loop.

The shoulder frame 106 is situated adjacent to the spiked wheel frame 104 and is configured to securely mount onto a closing wheel hub 114. The shoulder frame 106 evenly closes the seed trench formed by the spiked wheel frame 104 as the closing wheel assembly 102 rotates in the soil to optimally cover the seed for germination. The shoulder frame 106 is radially welded adjacent to the spiked wheel frame 104 to securely mount onto the closing wheel hub 114 to form the closing wheel assembly 102.

The shoulder frame 106 may be configured using the set of arch-shaped interlocking segments 108 to form the circular loop. The shoulder frame 106 may further be configured to displace the soil towards the seed trench to sufficiently cover the seed to enable optimum seed-to-soil contact. The shoulder frame 106 may ensure a better sidewall compaction, eliminate air pockets, and/or close the seed trench with inner rim shoulder firming.

The spiked wheel frame 104 may be configured to have a varying width, a varying shape, and/or a varying length of the outward projections of the radial teeth depending on a soil condition and/or crop requirement. The spiked wheel frame 104 and/or the shoulder frame 106 may be fabricated by cut steel, molded steel, a molded plastic, a forged steel, and/or a forged metal.

The shoulder frame 106 may be formed by a varying width and/or a varying depth depending on the soil conditions and/or crop requirement. An outermost edge of the shoulder frame 106 may align and/or not align with a base of the radial teeth of the spiked wheel frame 104. The outermost edge of the shoulder frame 106 may be equal and/or less than the base of the radial teeth of the spiked wheel frame 104 to enable sufficient penetration of the soil.

The arch-shaped interlocking segments 108 may be a jig element and/or an evenly defined end to hold the segments together forming the spiked wheel frame 104 and/or the shoulder frame 106. The puzzle element 302, the jig element and/or the evenly defined ends may be configured to precisely interlock with the corresponding segments to ensure a sturdy circular formation so as to not slip out of its position.

FIG. 1 is a schematic view 150 of a closing wheel assembly 102 of a planter 404 fabricated using a spiked wheel frame 104 and a shoulder frame 106 to optimally displace the soil 408 to cover the seed 406 while planting, according to one embodiment. Particularly, FIG. 1 illustrates a closing wheel assembly 102, a spiked wheel frame 104, a shoulder frame 106, an arch-shaped interlocking segment 108, a radial teeth 110, an interlocking joint 112, and closing wheel hub 114, according to one embodiment.

The closing wheel assembly 102 may be an assemblage of wheel components having outwardly directed circumferential teething projections and is rotatably mounted at the rear of a planter 404 to displace the soil 408 at the sides of a furrow 402 to gently close the furrow 402 to cover the seed 406 with soil 408 while planting. The closing wheel 210 may include six arch-shaped interlocking segments 108 forming the spiked wheel frame 104 and shoulder frame 106, that are welded together and fitted onto a standard closing wheel rim and bearing sets (e.g., closing wheel hub 114). In addition, the closing wheel assembly 102 may include a shoulder frame 106 fitted onto the inner rim 204 of the closing wheel assembly 102. The closing wheel assembly 102 may be designed to close the seed trench with inner rim shoulder firming using its shoulder frame 106, according to one embodiment.

In another embodiment, the closing wheel assembly 102 may include four and/or more arch-shaped interlocking segments 108 forming the closing wheel 210 welded together and fitted onto a standard closing wheel rim 208 and bearing sets (e.g., closing wheel hub 114). The closing wheel hub 114 may include a rim 208, a hub 202, an inner rim 204, and a disc 206.

The spiked wheel frame 104 and the shoulder frame 106 may be a set of two circular metal loops welded together to form the closing wheel assembly 102. The closing wheel 210 may be configured to easily fit onto the standard closing wheel rim and bearing sets. The outer periphery of the closing wheel 210 may come in contact with the soil while planting. The closing wheel 210 may include angular radial teeth 110 designed to penetrate the soil 408 to form the seed trench (e.g., furrow 402), according to one embodiment.

The closing wheel hub 114 may be a circular metal component configured to fit onto the inner rim 204 of the closing wheel assembly 102. The shoulder frame 106 of the closing wheel assembly 102 may be configured to put an appropriate amount of pressure onto the seed 406 and cover the soil 408 around the seed 406 to get the best seed-to-soil contact.

According to one embodiment, the arch-shaped interlocking segments 108 may be a set of three interconnecting metal bow-shaped sections that may be joined to form the closing wheel 210. In another embodiment, the arch-shaped interlocking segments 108 may be a set of two and/or more interconnecting metal bow-shaped sections that may be joined to form the closing wheel 210. The arch-shaped interlocking segments 108 may have a puzzle element 302 and a puzzle slot 304 at either of its ends that may precisely engage to the adjacent member to form a circular loop, without welding.

The larger circular loop forming the inner band of the spiked wheel frame 104 having radial teeth 110 of the closing wheel 210 may be configured using three larger pieces of arch-shaped interlocking segments 108 having radial teeth 110. The smaller outer band of shoulder frame 106 of the closing wheel 210 may be formed using three smaller pieces of arch-shaped interlocking segments 108. The three larger pieces of arch-shaped interlocking segments 108 forming the spiked wheel frame 104 having radial teeth 110 may be of half inch thick steel and the three smaller pieces of arch-shaped interlocking segments 108 forming the shoulder frame 106 on the side may be of three eights inch steel, according to one embodiment.

In another embodiment, the larger circular loop forming the inner band of the closing wheel 210 may be configured using two and/or more larger pieces of arch-shaped interlocking segments 108 having radial teeth 110. The smaller outer band of shoulder frame 106 of the closing wheel 210 may be formed using two and/or more smaller pieces of arch-shaped interlocking segments 108.

The radial teeth 110 may be a series of annular projections provided at the outer periphery of one of closing wheel 210 designed to penetrate the soil 408. The angular tooth design of the radial teeth 110 may help prevent clogging and promote consistent plant emergence. The spiked closing wheel assembly 102 may enable a unique combination of sidewall crumbling and soil firming, according to one embodiment.

The interlocking joint 112 may be an interconnection between two adjacent arch-shaped interlocking segments 108 forming a metal hoop. Each of the closing wheel 210 may be formed by three interlocking joints 112 between three arch-shaped interlocking segments 108, according to one embodiment.

In an additional embodiment, each of the closing wheel 210 may be formed by two and/or more interlocking joints 112 between two and/or more arch-shaped interlocking segments 108.

Figure 2:
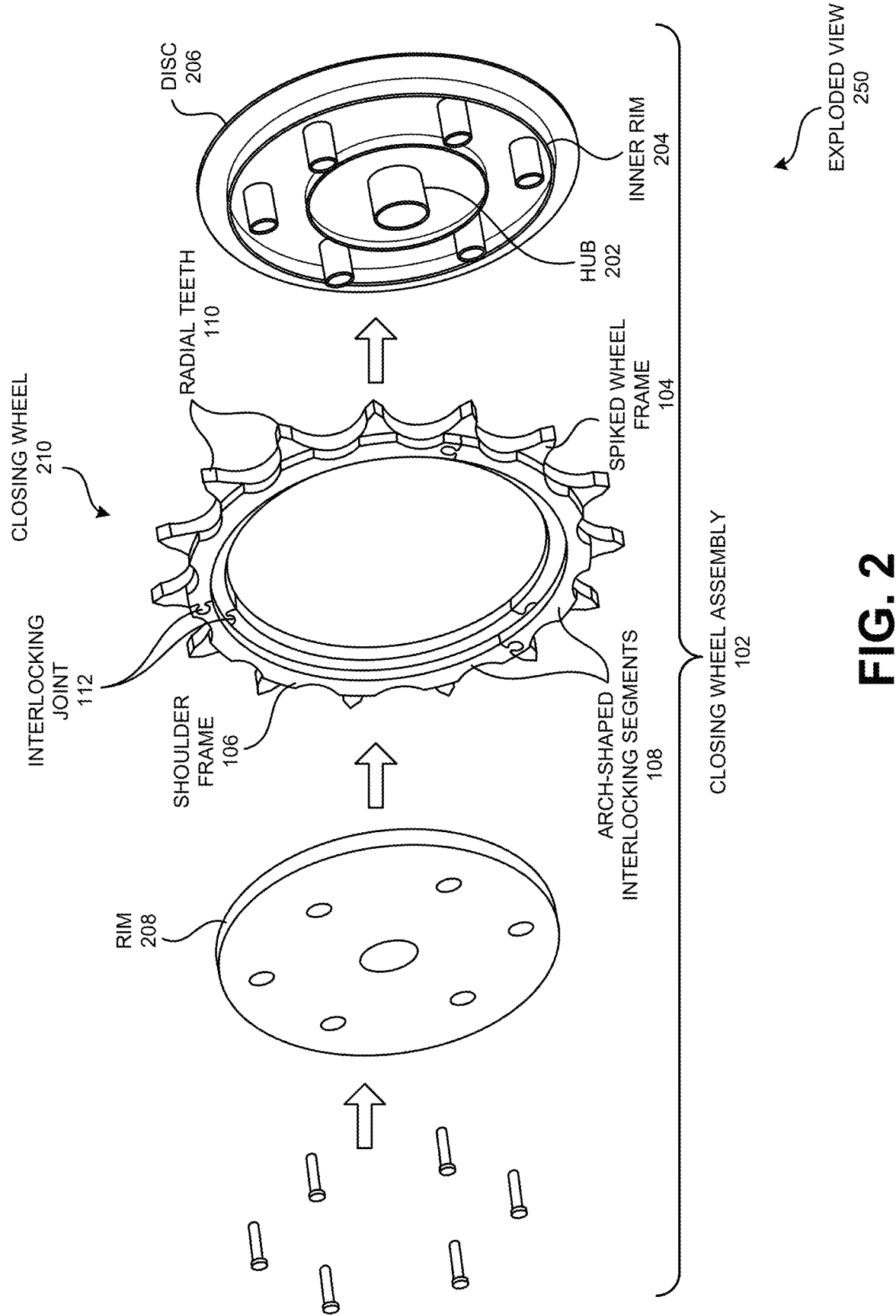
FIG. 2 is an exploded view of the closing wheel assembly of FIG. 1 illustrating the constituting components of the closing wheel assembly, according to one embodiment.

FIG. 2 is an exploded view 250 of the closing wheel assembly 102 of FIG. 1 illustrating the constituting elements of the closing wheel 102, according to one embodiment. Particularly, FIG. 2 builds on FIG. 1, and further adds, a hub 202, an inner rim 204, a disc 206, a rim 208, and a closing wheel 210. The hub 202 may be the central part of the closing wheel assembly 102, rotating on or with the axle. The hub 202 may enable the closing wheel assembly 102 to be attached to the planter 404 and allows the closing wheels assembly 102 to freely turn during planting. The inner rim 204 may be an interior periphery of the hub assembly on which the closing wheel 210 are mounted to form the closing wheel assembly 102. The disc 206 may be an outer shield used to fit and cover the closing wheel 210 onto the inner rim 204 of the closing wheel assembly 102.

Figure 3:
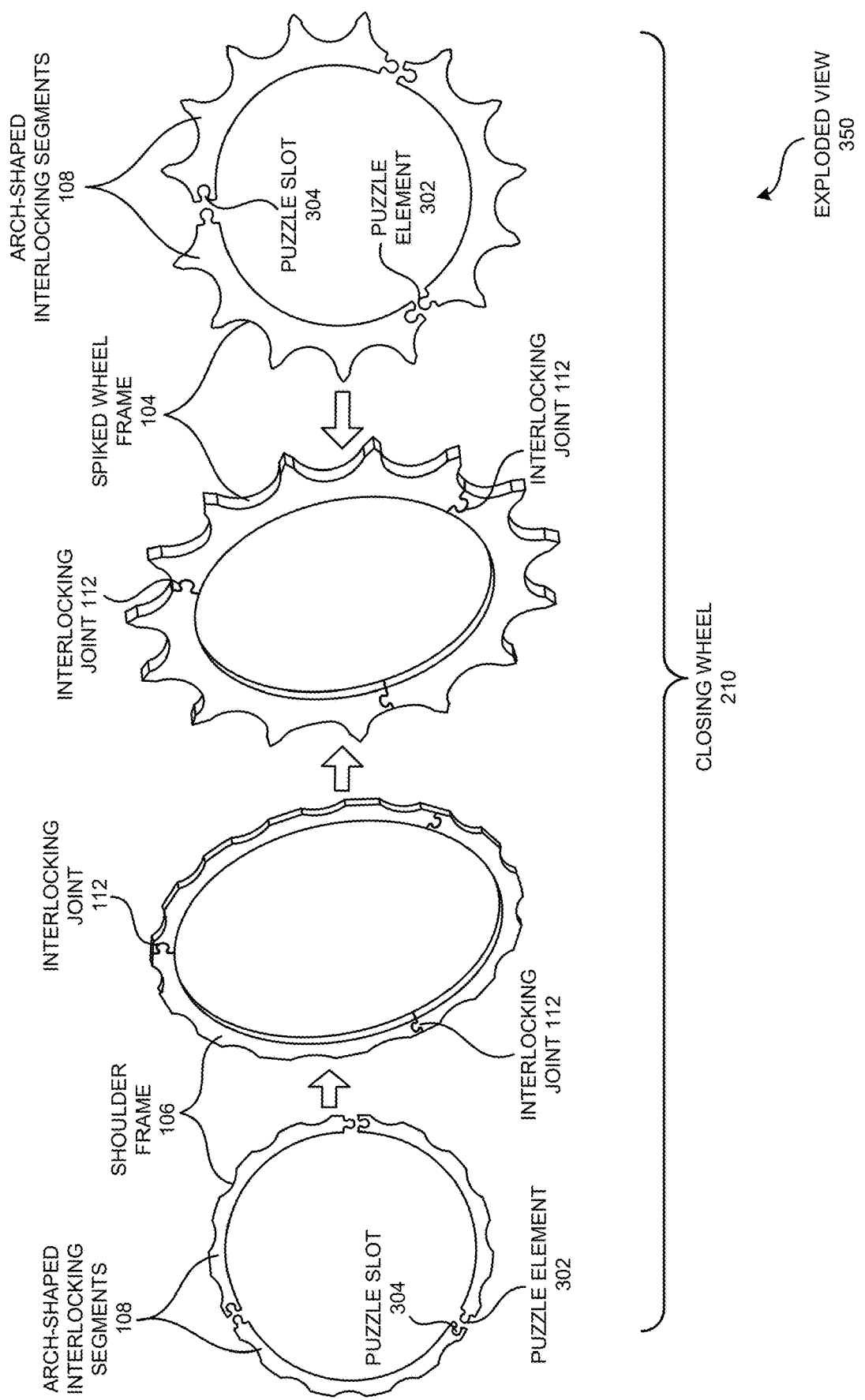
FIG. 3 is an exploded view of the closing wheel of the closing wheel assembly of FIG. 1 illustrating the interlinking of the arch-shaped interlocking segments to precisely secure with the adjacent segment to form the closing wheel, according to one embodiment.

FIG. 3 is an exploded view 350 of the closing wheel 210 of the closing wheel assembly 102 of FIG. 1 illustrating the interlinking of the arch-shaped interlocking segments 108 to form the closing wheel 210, according to one embodiment. Particularly, FIG. 3 builds on FIGS. 1 and 2, and further adds, a puzzle element 302 and a puzzle slot 304.

The puzzle element 302 may be a particular riddle-like shape provided at one of the ends of the arch-shaped interlocking segments 108 configured to precisely fit into the puzzle slot 304 provided at another end of the adjacent arch-shaped interlocking segments 108. The puzzle element 302 and the puzzle slot 304 provided at either ends of the arch-shaped interlocking segments 108 may help to interlink the two arch-shaped interlocking segments 108 accurately without requiring welding to form the joints. The two spiked wheel frame 104 and shoulder frame 106 formed using the puzzle element 302 and the puzzle slot 304 may make the perfect circular loop that does not slip out of its position while handling the closing wheel 210.

In one embodiment, the arc created by the radial teeth 110 of the arch-shaped interlocking segments 108 may not be a pure circle. The arc of the closing wheel assembly 102 may continue to be slightly open when mounted on the planter 404 and then as it approaches the tips; it may open faster to ensure that it becomes more difficult for rocks and/or similar debris to become caught between the radial teeth 110. Additionally, the radial teeth 110 may not be extended out to form a narrower point, hence, it may not create a weak spot to result in breakage if the closing wheel assembly 102 hits a rock in the field.

Figure 4:
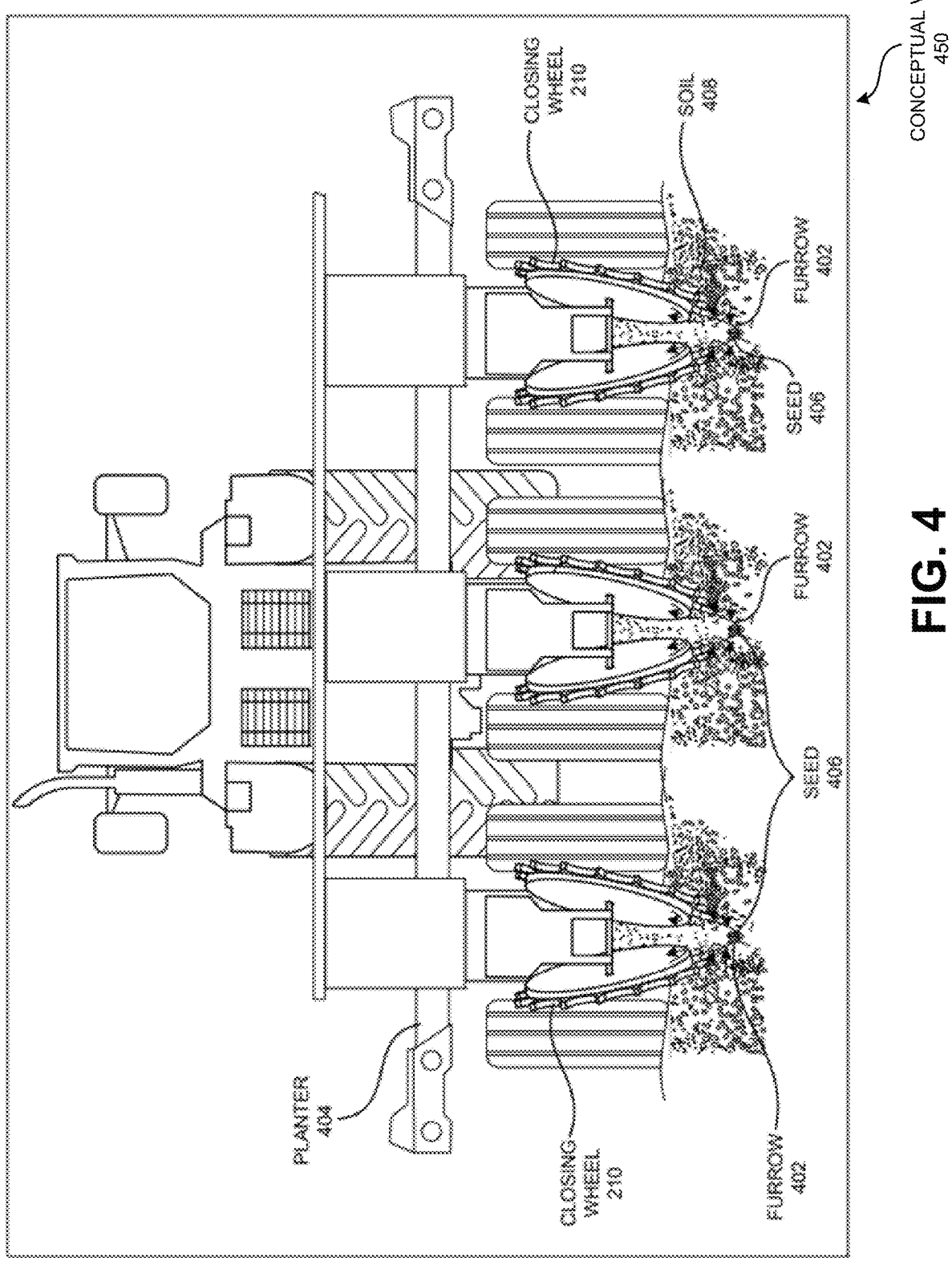
FIG. 4 is a conceptual view illustrating the functioning of the closing wheel assembly of FIG. 1 to optimally cover the seed while planting, according to one embodiment.

FIG. 4 is a conceptual view 450 illustrating the functioning of the closing wheel assembly 102 of FIG. 1 to optimally cover the seed 408 while planting, according to one embodiment. As displayed in the figure, a set of closing wheels assembly 102 may be mounted at the rear of a planter 404. The planter 404 may open a furrow 402 and place a seed 406 in it. The closing wheel assembly 102 mounted at the rear of the planter 404 may move along the sidewalls of the furrow 402. The radial teeth 110 of the disclosed closing wheel assembly 102 may go into the ground and fracture off the dirt and/or soil 408 into the furrow 402. The shoulder frame 106 of the closing wheel assembly 102 may put just the right amount of soil at the surface to bring pressure down on to the seed 406 and form the soil 408 layer around the seed 406 to get the best seed-to-soil contact. This may further enable an increased seedling emergence since the seedling may easily push itself through a thin layer of soil. In addition, the roots of seedling may be able to penetrate through the sidewalls resulting in an improved root formation and yield.

The disclosed closing wheel assembly 102 may be configured to have wider teeth to displace sufficient amount of dirt and/or soil 408 into the furrow 402. The shoulder frame 106 of the closing wheel assembly 102 may turn this displaced soil towards the furrow 402 to sufficiently cover the seed 406 for optimum seed-to-soil contact.

In another embodiment, the radial teeth 110 and/or the shoulder frame 106 may have variable thickness based on soil condition and/or crop requirement. In one more embodiment, the closing wheels may be mounted at a distance of 1.4 to 1.5 inches between the shoulder frames 106 for optimal functioning of the closing wheels assembly 102 to ensure an improved germination and emergence of a crop for higher yield.

Although the present embodiments have been described with reference to specific example embodiments, it will be evident that various modifications and changes may be made to these embodiments without departing from the broader spirit and scope of the various embodiments.

A number of embodiments have been described. Nevertheless, it will be understood that various modifications may be made without departing from the spirit and scope of the claimed invention.

The invention claimed is:

1. A closing wheel assembly for an agricultural planter, comprising:
   a spiked wheel frame having a series of outwardly projected radial teeth configured to penetrate soil to form a seed trench,
       wherein the spiked wheel frame is formed using a set of arch-shaped interlocking segments,
       wherein each of the arch-shaped interlocking segments to include a puzzle element and a puzzle slot at its ends, and
       wherein the puzzle element of each of the arch-shaped interlocking segments is configured to precisely fit into the puzzle slot of an adjacent arch-shaped interlocking segment of the arch-shaped interlocking segments to form a circular loop; and
   a shoulder frame situated adjacent to the spiked wheel frame configured to securely mount onto a closing wheel hub,
       wherein the shoulder frame to displace the soil towards the seed trench to close the seed trench formed by the spiked wheel frame as the closing wheel assembly rotates in the soil to cover the seed by forming a soil layer around the seed for germination, and
       wherein the shoulder frame is radially welded adjacent to the spiked wheel frame to securely mount onto the closing wheel hub to form the closing wheel assembly.

2. The closing wheel assembly of claim 1, wherein the shoulder frame is configured using the set of arch-shaped interlocking segments to form the circular loop:
   to displace the soil towards the seed trench to enable seed-to-soil contact following the soil layer formed around the seed by the displaced soil, and
   to enable sidewall compaction through soil firming, eliminate air pockets, and close the seed trench with inner rim shoulder firming.

3. The closing wheel assembly of claim 1, wherein the spiked wheel frame is configured to have at least one of a width, a shape, and a length of the outward projections of the radial teeth modified depending on at least one of a soil condition and a crop requirement.

4. The closing wheel assembly of claim 1, wherein the spiked wheel frame and the shoulder frame are at least one of a cut steel, a molded steel, a molded plastic, a forged steel, and a forged metal.

5. The closing wheel assembly of claim 1, wherein the shoulder frame is formed by modifying at least one of a width and a depth depending on at least one of a soil condition and a crop requirement.

6. The closing wheel assembly of claim 1, wherein an outermost edge of the shoulder frame is configured to at least one of align and not align with a base of the radial teeth of the spiked wheel frame.

7. The closing wheel assembly of claim 1, wherein:
   the puzzle element of each of the arch-shaped interlocking segments precisely fits into the puzzle slot of the adjacent arch-shaped interlocking segment to form the spiked wheel frame, and
   the puzzle element of each of the arch-shaped interlocking segments is configured to precisely interlock with at least one other arch-shaped interlocking segment of the arch-shaped interlocking segments.

8. The closing wheel assembly of claim 1, wherein a width of the radial teeth is half of an inch and a width of the shoulder frame is ⅜th of an inch to displace the soil.

9. A closing wheel assembly for an agricultural planter, comprising:
   a set of arch-shaped interlocking segments forming a spiked wheel frame having a series of outwardly projected radial teeth configured to penetrate soil to form a seed trench,
       wherein each of the arch-shaped interlocking segments to include a puzzle element and a puzzle slot at its ends, and
       wherein the puzzle element of each of the arch-shaped interlocking segments is configured to precisely fit into the puzzle slot of an adjacent arch-shaped interlocking segment of the arch-shaped interlocking segments to form a circular loop; and
   a shoulder frame situated adjacent to the spiked wheel frame configured to securely mount onto a closing wheel hub and to displace the soil towards the seed trench to close the seed trench formed by the spiked wheel frame when the closing wheel assembly rotates in the soil to cover the seed by forming a soil layer around the seed for germination, wherein the shoulder frame is radially welded adjacent to the spiked wheel frame to securely mount onto the closing wheel hub to form a closing wheel of the closing wheel assembly.

10. The closing wheel assembly of claim 9, wherein the closing wheel is a first closing wheel, wherein the closing wheel assembly further comprises a second closing wheel substantially identical to the first closing wheel, and wherein the first and second closing wheels are mounted at a distance of 1.4 to 1.5 inches between the shoulder frames of the first and second closing wheels for attaching to a rear of a planter.

11. A method of a closing wheel assembly for an agricultural planter, comprising:
   forming a spiked wheel frame having a series of outwardly projected radial teeth configured to penetrate soil to form a seed trench using a set of arch-shaped interlocking segments,
       wherein each of the arch-shaped interlocking segments to include a puzzle element and a puzzle slot at its ends, and
       wherein the puzzle element of each of the arch-shaped interlocking segments is configured to precisely fit into the puzzle slot of an adjacent arch-shaped interlocking segment of the arch-shaped interlocking segments to form a circular loop; and
   securely mounting a shoulder frame situated adjacent to the spiked wheel frame onto a closing wheel hub,
       wherein the shoulder frame to close the seed trench formed by the spiked wheel frame as the closing wheel assembly rotates in the soil to cover the seed by forming a soil layer around the seed for germination, and wherein the shoulder frame is radially welded adjacent to the spiked wheel frame to securely mount onto the closing wheel hub to form the closing wheel assembly.

12. The method of claim 11, further comprising:
configuring the shoulder frame to displace the soil towards the seed trench to cover the seed to enable seed-to-soil contact following the soil layer formed around the seed by the displaced soil, a sidewall compaction, eliminate air pockets, and close the seed trench with inner rim shoulder firming.

13. The method of claim 11, further comprising:
forming the shoulder frame to close the seed trench in a variable soil condition with inner rim shoulder firming, wherein the variable soil condition includes at least one of a wet soil and soil crusting due to frequent rain.

14. The method of claim 11, further comprising:
forming the shoulder frame to aid as a depth gauge by allowing depth control in a light sandy soil by preventing deep running of the closing wheel assembly.

15. The method of claim 11, further comprising:
fabricating the outwardly projected radial teeth angularly to prevent clogging in wet soil.

16. The method of claim 11, further comprising:
forming the spiked wheel frame to have at least one of a width, a shape, and a length of the outward projections of the radial teeth depending on at least one of a soil condition and crop requirement.

* * * * *